E. A. GOTTERBA.
DRIVING AND STEERING DEVICE FOR VEHICLES.
APPLICATION FILED JUNE 30, 1908.

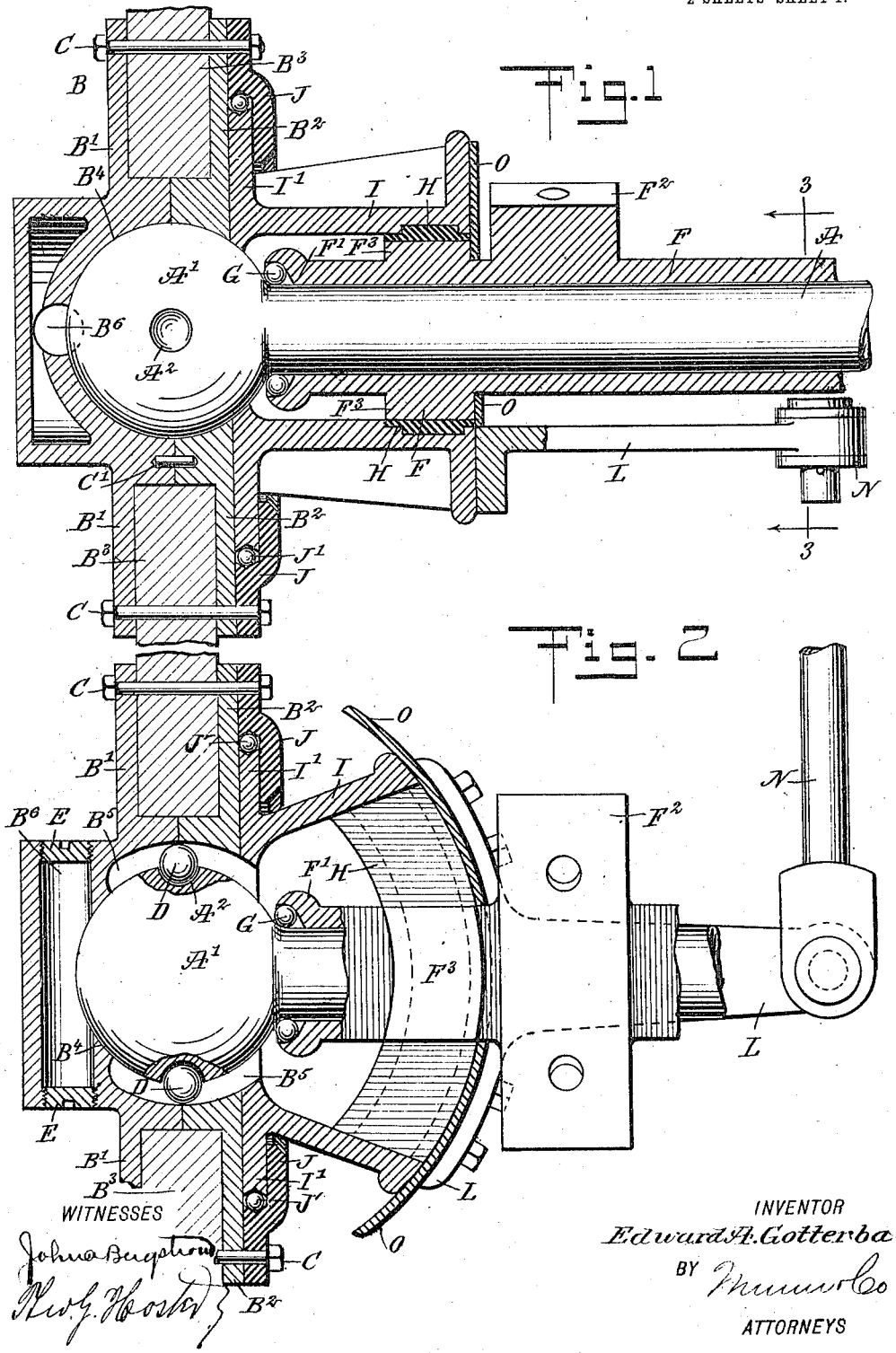

989,501.

Patented Apr. 11, 1911.

2 SHEETS—SHEET 2.

WITNESSES

INVENTOR
Edward A. Gotterba
BY
ATTORNEYS

UNITED STATES PATENT OFFICE.

EDWARD ANTHONY GOTTERBA, OF BISBEE, ARIZONA TERRITORY.

DRIVING AND STEERING DEVICE FOR VEHICLES.

989,501.

Specification of Letters Patent. Patented Apr. 11, 1911.

Application filed June 30, 1908. Serial No. 441,053.

*To all whom it may concern.*

Be it known that I, EDWARD A. GOTTERBA, a citizen of the United States, and a resident of Bisbee, in the county of Cochise and Territory of Arizona, have invented a new and Improved Driving and Steering Device for Vehicles, of which the following is a full, clear, and exact description.

The object of the invention is to provide a new and improved driving and steering device for automobiles, marine vessels and other vehicles, and arranged to permit driving the vehicle or propeller wheel or turning the same into any angular position for steering purposes, the device being simple and durable in construction, easily manipulated, and arranged to effectively transmit the power and to reduce the friction to a minimum.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 3:
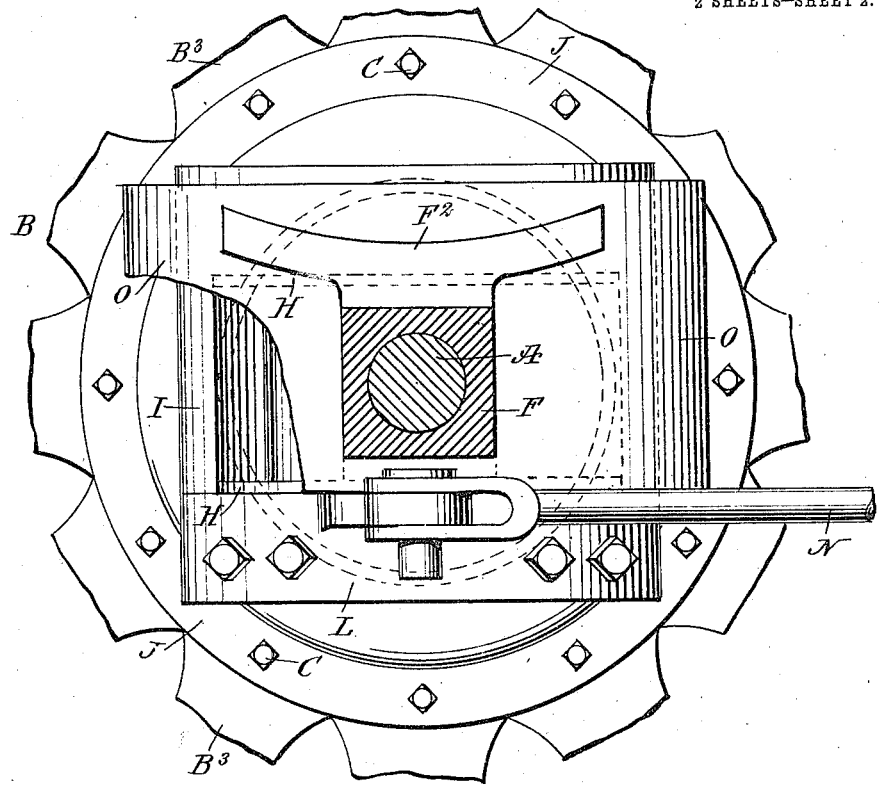
Figure 4:
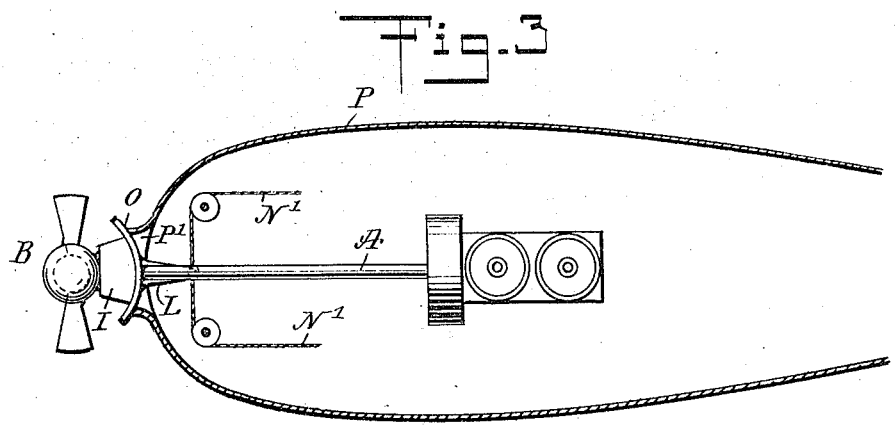

Figure 1 is a central longitudinal section of the improvement as applied to the front axle of an automobile; Fig. 2 is a sectional plan view of the same; Fig. 3 is a cross section of the same on the line 3—3 of Fig. 1; and Fig. 4 is a reduced plan view of the improvement as applied to a marine vessel, the hull of the latter being shown in section.

The shaft or axle A of the vehicle is driven from a motor in any suitable manner, and each end of the shaft or axle A is connected by a ball and socket joint with the vehicle or propeller wheel B to be driven and to be turned in a horizontal plane for steering purposes.

As shown in the drawings, the wheel B is provided with a two-part hub $B'$, $B^2$ carrying the spokes $B^3$ secured in place by bolts C, which also fasten the two parts $B'$, $B^2$ of the hub together. Dowel pins $C'$ also connect the hub parts $B'$ and $B^2$ with each other, as indicated in Fig. 1. In the hub parts $B'$, $B^2$ is formed a socket $B^4$ into which fits the ball $A'$ integral with the corresponding end of the shaft A, and the said ball $A'$ is provided on its peripheral face with seats $A^2$ for ball keys D extending into elongated slots $B^5$ formed transversely in the wall of the socket $B^4$, as plainly shown in Fig. 2. Now when the shaft A is turned the balls D are carried along and thus rotate the wheel B.

A lubricant is supplied to the ball and socket joint from a well $B^6$ formed in the outer hub part $B'$ and closed at the top and bottom by suitable screw plugs E, as indicated in Fig. 2.

In order to turn the wheel B in a horizontal plane for steering purposes, the following arrangement is made: On the shaft or axle A is fitted a sleeve F provided at its outer end with a ball race $F'$ for bearing balls G traveling on the shaft or axle A at the junction of the latter with its terminal ball $A'$. The sleeve F is provided on top with a saddle $F^2$ for the vehicle springs to rest on, and the sleeve F between the saddle $F^2$ and the ball race $F'$ is provided on the top and bottom with flat surfaces $F^3$ fitting onto bearings H held in the top and bottom of a steering and guiding head I, provided at its inner end with a flange $I'$ abutting against the outer face of the hub part $B^2$ of the wheel B. A retaining ring J is fastened by the bolts C to the hub part $B^2$, and the said retaining ring J has an offset portion extending over the flange $I'$ to hold the latter in place and to allow the wheel B to turn on the flange, suitable ball bearings $J'$ being interposed between the annular edge of the flange $I'$ and the retaining ring J, as plainly indicated in Fig. 1.

As shown in the drawing the flange $I'$ is provided with a peripheral groove and the retaining ring J at its junction with the offset portion has a corresponding groove, the ball bearings $J'$ being arranged in the said grooves.

To the inner end of the head I is secured a bar L connected with the steering device N (see Figs. 1, 2 and 3) or $N'$, as shown in Fig. 4, to allow the operator in charge of the vehicle to turn the head I and with it the wheel B in a horizontal plane with a view to steer the vehicle to the right or left according to the direction in which the head I is turned. It is understood that the elongated opening in the head I permits turning the head I and the wheel B to a desired degree without interfering with the shaft A and its sleeve F as the latter slides on the bearings H.

In order to close the opening to the head I, with a view to exclude dust and other impurities from the ball and socket joint, shields O are provided attached to the sleeve F, and normally project beyond the sides of the head I, so that when the latter is turned, the opening leading thereto is closed at all times, and hence dust and the like cannot pass into the head and to the ball and socket joint. As shown in Fig. 4, the shields O also close the opening P' in the stern of the hull P of the vessel on which the improvement is used, for propelling and steering the vessel, by rotating the propeller wheel B and by turning the same to one side or the other.

Having thus described my invention, I claim as new and desire to secure by Letters Patent:

1. A propelling and steering device, comprising a driven shaft having a spherical terminal, a wheel having a two-part hub formed with a socket in which the said spherical terminal is journaled, a ball key seated on the said shaft terminal and engaging an elongated groove in the said hub, a steering and guiding head under the control of the operator, and having a flange engaging the inner face of the hub, a retaining ring engaging the inner face of the hub and having a portion extending over the said flange, and bolts extending through the retaining ring and the parts of said hub.

2. A propelling and steering device for vehicles, comprising a wheel provided with a two-part hub, spokes carried by said hub, a driven shaft, a ball and socket joint connection between the hub of the said wheel and the said shaft, a ball key seated in a recess in the ball of the said ball and socket joint connection and in an elongated groove in the wall of the socket of the said ball and socket joint connection, the said groove extending in a plane passing through the axis of the wheel and shaft, a steering and guiding head having a flange engaging the inner face of the hub, a retaining ring extending over the said flange, and bolts for fastening the two parts of the hub together, the said bolts also securing the said spokes and the said retaining ring in position.

3. A propelling and steering device comprising a driven shaft having a spherical terminal, a wheel having a two-part hub consisting of an inner and an outer member, the hub being formed with a socket in which the said spherical terminal is journaled, a ball key seated on the said shaft terminal and engaging an elongated groove in the said hub, a steering and guiding head under the control of the operator and having a flange engaging the inner face of the inner member of the hub, a retaining ring extending over the said flange, bolts for securing the two parts of the hub together, the said bolts extending through the retaining ring and securing the same to the hub, a sleeve on the shaft and fitting the top and bottom walls of the said steering and guiding head, the said sleeve being provided at its outer end with a ball race, bearing balls in said race and traveling on the said shaft at the junction of the latter with its spherical terminal, and ball bearings between the edge of the flange of said steering and guiding head and the said retaining ring.

4. A propelling and steering device comprising a driven shaft having a spherical terminal, a wheel having a two-part hub formed with a socket in which the said spherical terminal is journaled, spokes carried by said hub, a steering and guiding head having a flange engaging the inner face of the hub, a retaining ring engaging the inner face of the hub and extending over the said flange, and bolts extending through the retaining ring the two-parts of the hub and the said spokes.

5. A propelling and steering device, comprising a driven shaft, having a spherical terminal, a wheel having a two part hub formed with a socket in which the said spherical terminal is journaled, ball keys seated on the said shaft terminal and engaging elongated grooves in the hub, a steering and guiding head under the control of the operator and having a flange at its outer end engaging the inner face of the hub, a retaining ring engaging the inner face of the hub and having a portion extending over the flange of the steering and guiding head and engaging the inner face thereof, bolts extending through the retaining ring and the two parts of the hub and securing said parts together, ball bearings interposed between the annular edge of said flange and the retaining ring, a sleeve on the shaft provided on the top and bottom with flat surfaces fitting the top and bottom walls of the steering and guiding head, the said sleeve being provided at its outer end with a ball race, bearing balls in said race and traveling on the said shaft at the junction of the latter with its spherical terminal, and means carried by the sleeve for closing the opening in the steering and guiding head.

In testimony whereof I have signed my name to this specification in the presence of two subscribing witnesses.

EDWARD ANTHONY GOTTERBA.

Witnesses:
   IVA E. SHUSTER,
   MONROE A. STANFORD.